United States Patent [19]

Safadi

[11] Patent Number: 5,379,278
[45] Date of Patent: Jan. 3, 1995

[54] METHOD OF AUTOMATIC COMMUNICATIONS RECOVERY

[75] Inventor: Reem B. Safadi, Horsham, Pa.
[73] Assignee: Honeywell Inc., Minneapolis, Minn.
[21] Appl. No.: 93,115
[22] Filed: Jul. 16, 1993
[51] Int. Cl.$^6$ .............................................. H04L 1/22
[52] U.S. Cl. ...................................... 370/16; 371/8.2; 371/11.2
[58] Field of Search .................... 370/13, 16, 16.1; 371/8.1, 8.2, 11.1, 11.2, 20.1, 20.6, 29.5

[56] References Cited

U.S. PATENT DOCUMENTS

| | | | |
|---|---|---|---|
| 4,700,344 | 10/1987 | Kaino et al. | 370/13 |
| 4,701,910 | 10/1987 | Ulug | 370/13 |
| 5,079,759 | 1/1992 | Kajiyama | 370/13 |
| 5,111,460 | 5/1992 | Botzenhardt et al. | 370/13 |
| 5,200,949 | 4/1993 | Kobayashi | 370/13 |

*Primary Examiner*—Wellington Chin
*Attorney, Agent, or Firm*—A. A. Sapelli; W. T. Udseth; A. Medved

[57] ABSTRACT

In a local area network system having redundant communication media and a plurality of nodes, each node is connected to the redundant communication media. Each node is capable of communicating with each other node in accordance with a predetermined protocol via the redundant communication media. Further, each node is capable of disconnecting from the redundant communication media when an error in communications is detected. A method of automatically reconnecting the node to the redundant communication media after the node disconnects from the redundant communication media comprises the following steps. When a faulty condition is detected, the node disconnects itself from the redundant communication media. Internal testing of the node is then performed. If the internal testing passes, the node attempts to reconnect itself to the redundant communication media. If the attempted reconnect is unsuccessful, the node waits a first predetermined period of time and proceeds to the step of repeating the internal testing. If the attempted reconnect is successful, normal communications by the node are resumed over the redundant communication media thereby achieving an automatic reconnect without requiring any operator or manual intervention.

5 Claims, 4 Drawing Sheets

METHOD OF AUTOMATIC COMMUNICATIONS RECOVERY

BACKGROUND OF THE INVENTION

The present invention relates to a communications method, and more particularly, to a method of automatic communication recovery.

In present systems, in which nodes on a redundant media local area network lose their ability to communicate, human intervention is required to allow the node to regain its communications. The present invention eliminates the need for human intervention and effects recovery of Communications by the node.

SUMMARY OF THE INVENTION

Therefore there is provided by the present invention a method of automatic communications recovery. In a local area network system having redundant communication media and a plurality of nodes, each node is connected to the redundant communication media. Each node is capable of communicating with each other node in accordance with a predetermined protocol via the redundant communication media. Further, each node is capable of disconnecting from the redundant communication media when an error in communication media is detected. A method of automatically reconnecting the node to the redundant communication media after the node disconnects from the redundant communication media comprises the following steps. When a transmission problem of the communications is detected, the node disconnects itself from the redundant communication media. Internal testing of the node is then performed. If the internal testing passes, the node attempts to reconnect itself to the redundant communication media. If the attempted reconnect is unsuccessful, the node waits a first predetermined period of time proceeds to the step of repeating the internal testing. If the attempted reconnect is successful, normal communications by the node are resumed over the redundant communication media, thereby achieving an automatic reconnect without requiring any operator or manual intervention.

Accordingly, it is an object of the present invention to provide a method of communications recovery.

It is another object of the present invention to provide a method of automatic communications recovery.

It is still another object of the present invention to provide a method of automatic communications recovery of a node on a redundant media local area network.

These and other objects of the present invention will become more apparent when taken in conjunction with the following description and drawings, wherein like characters indicate like parts, and which drawings form a part of the present application.

DETAILED DESCRIPTION

Figure 1:
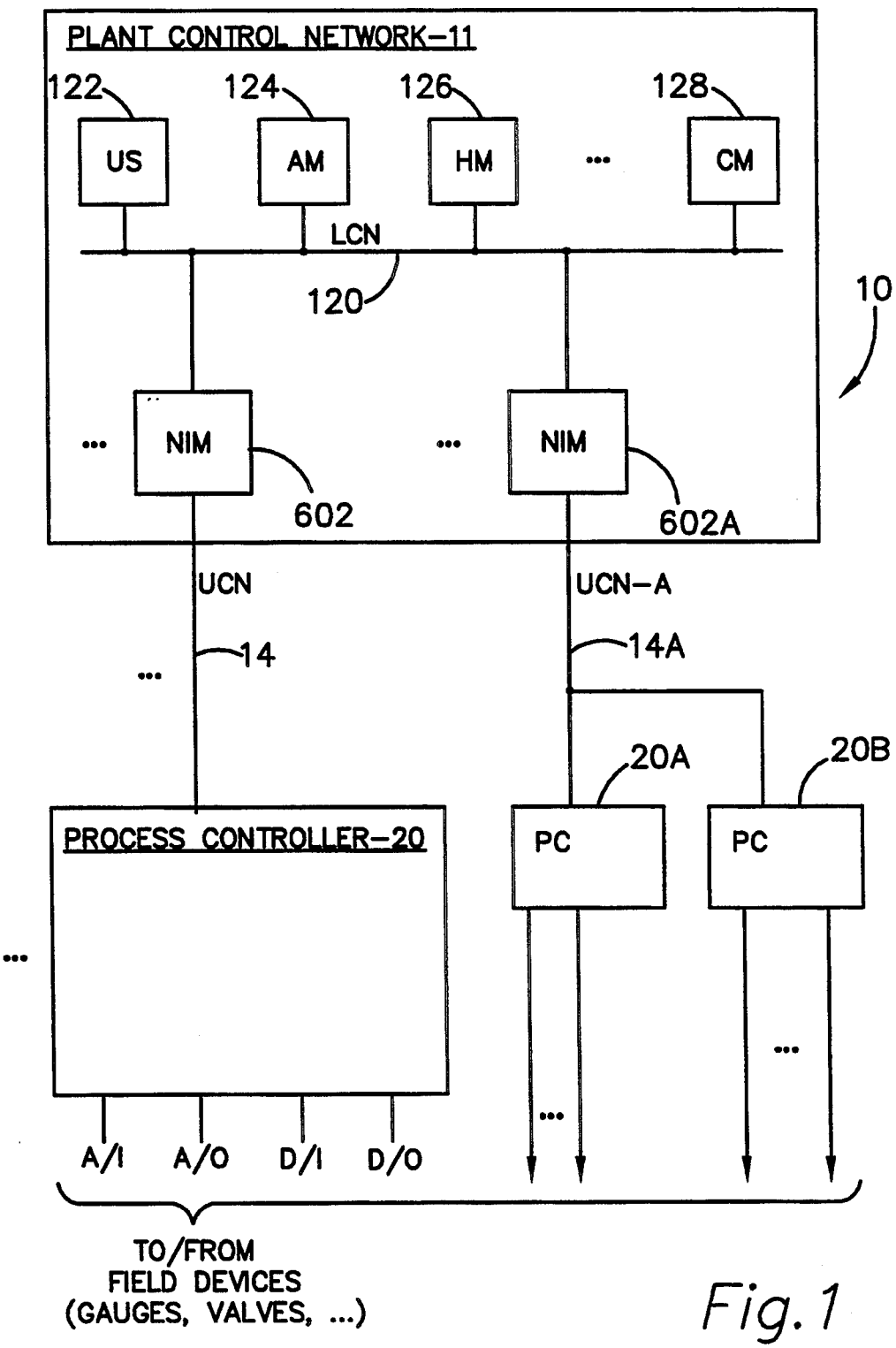
FIG. 1 shows a block diagram of a process control system in which the present invention can be utilized.

Before describing the method of the present invention, it will be helpful in understanding a system environment in which the present invention can be utilized. Referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via the same UCN 14, and additional UCNs 14 can be added to the plant control network 11 via additional corresponding NIMs 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules is operatively connected to a local control network (LCN) 120 which permits each of these modules to communicate with each other as necessary. The NIM 602, which is also duplicated for redundancy purposes, provides an interface between the LCN 120 and the UCN 14. A more complete description of the plant control network 11, and the physical modules can be had by reference to U.S. Pat. No. 4,607,256.

Figure 2:
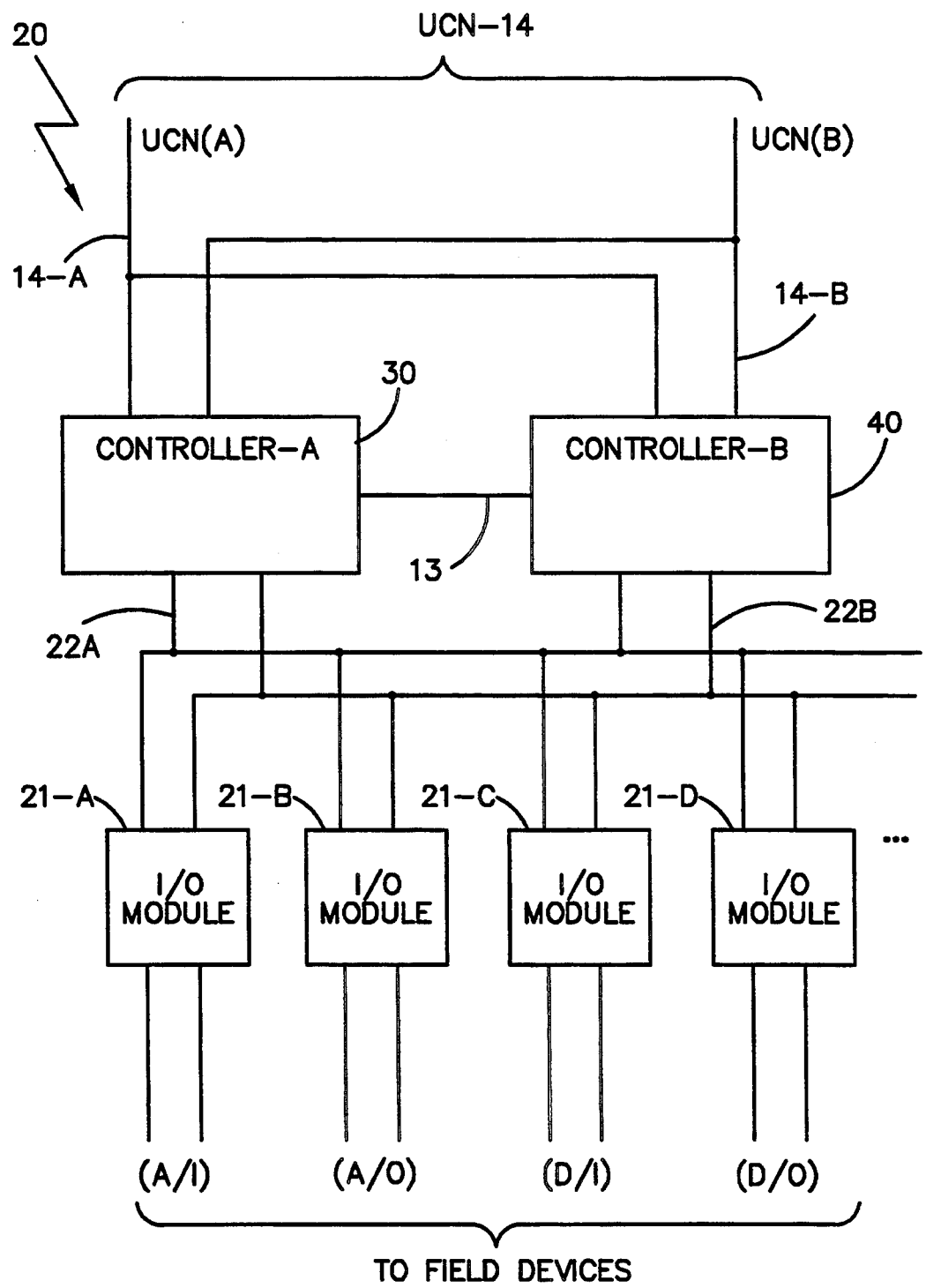
FIG. 2 shows a block diagram of a process controller, including I/O modules (IOP), in which the present invention can be utilized.

Referring to FIG. 2 there is shown a block diagram of the process controller 20. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 and controller B 40 interface to one or more I/O modules via a bus 22, the bus 22 in the preferred embodiment, comprising for communication redundancy purposes, a bus 22A and a bus 22B.

Controller A and controller B, 30, 40, can communicate with each other via three mediums, the UCN 14, a link 13 between the controllers, and the buses 22A, 22B, with bus 22A and bus 22B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator (via the universal station 122) through the network interface module 602, which acts as a gateway between the two networks (UCN and LCN). In addition, a data base maintained by the primary controller is communicated to the secondary controller via link 13. [As mentioned above, one controller operates as either a primary or secondary controller; however, it will be understood by those skilled in the art that a secondary controller is not necessary for the process controller 20, i.e., is non-redundant.]

Figure 3:
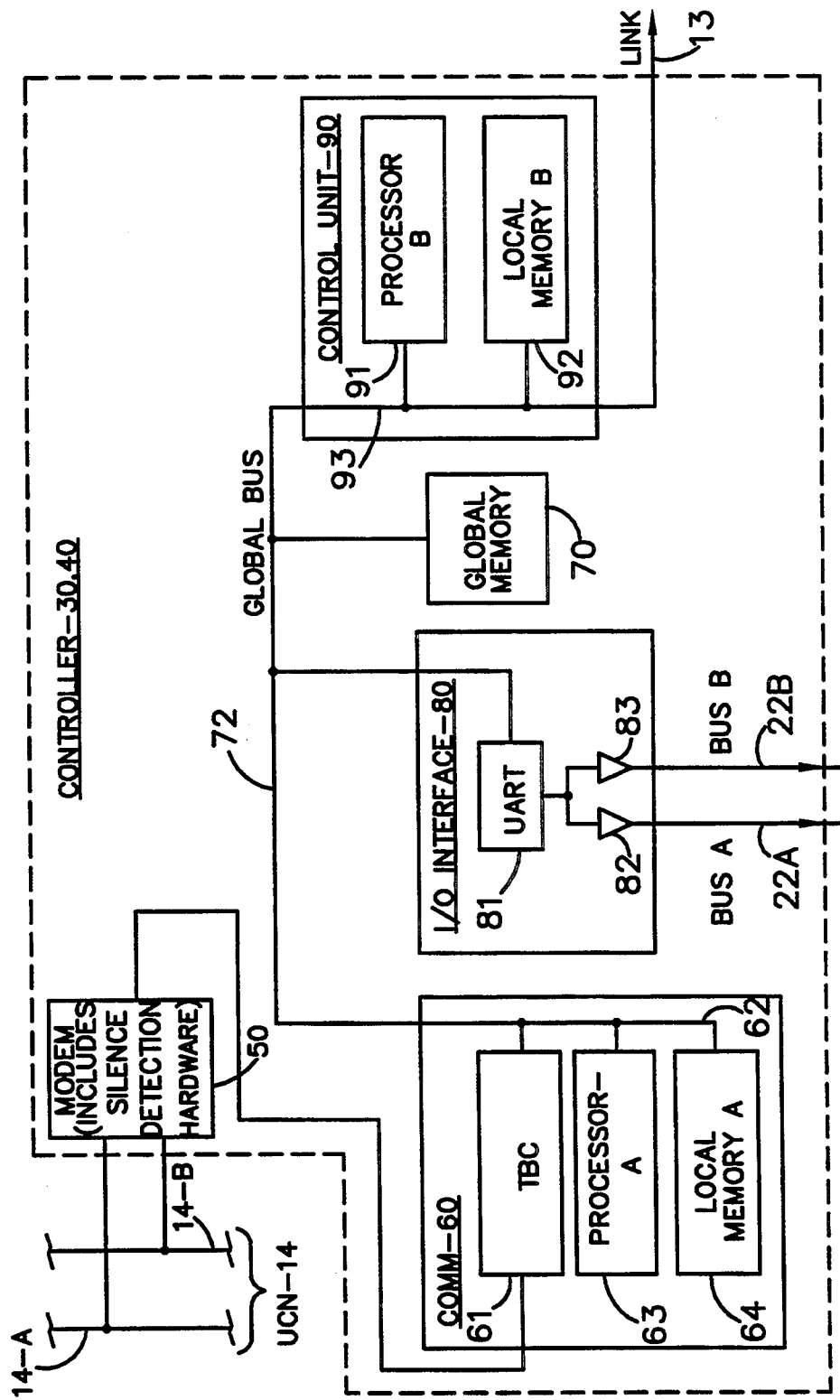
FIG. 3 shows a block diagram of a controller which is included in the process controller of FIG. 2.

Referring to FIG. 3, there is shown a block diagram of the controller 30, 40. A modem 50 (which includes silence detection hardware) is connected to the UCN 14, the modem having two connectors, one connected to UCN 14A and the other connected to UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the universal control network 14 via modem 50 and TBC 61. The local memory A 64 stores information, including personality image which is downloaded from the plant control network 11 through universal control network 14, for use by processor controller 20. The global memory 70 stores information which is common to both processor A 63 and a processor B 91. It also stores all the data received from bus 22A and bus 22B. The global memory 70 also serves as an interprocessor communication interface between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20.

The I/O interface unit 80 includes a receiver/transmitter device, this device being a UART (Universal Asynchronous Receiver/Transmitter) 81. The UART 81 is coupled through drivers 82, 83 to bus 22A and bus 22B, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

The method of the present invention will now be described.

The system 10 of the preferred embodiment includes a LAN (local area network) based on IEEE 802.4 Token Bus Passing standard. Further in the preferred embodiment, each node (being a process controller module or a network interface module) is generally redundant, as described above. In such case, one node operates as a primary, and the redundant node is passive, as described above. The method of the present invention is most useful and most needed when the system includes dual and multiple communication bus failures, i.e., on both media of UCN 14. When double cable faults exist, i.e., faults on UCN A—14A and UCN B—14B, each node residing on the UCN attempts to determine which cable is better 14A or 14B when a faulty (noisy or silence) condition is detected, and switch to the better cable. Each node, and more specifically the token bus controller (TBC) 61 of the node, includes intelligence to detect a jabber condition or a faulty transmitter, and reacts to the conditions by switching to the other cable or taking itself off-line. (The TBC 61 of the preferred embodiment of the system is a Motorola MC 68824 Token Bus Controller.) When either of these conditions (jabber or faulty transmitter) is detected, the TBC 61 assumes that its internal hardware is faulty as dictated by the implementation of IEEE 802.4 protocol, in that the listen process may be done only on one medium but the transmission may be done on both media. Once the TBC 61 takes itself off-line, the node can no longer communicate over the UCN 14.

When the TBC 61 takes itself off-line, that is an indication that the deterioration was severe enough to cause the TBC 61 to think that there is a hardware problem, as far as its own transmission or reception is concerned. If the TBC 61 does not take itself off-line things were not bad enough to cause a disconnection to happen. If the logic of the TBC 61 manages to keep communications going or the fault itself was not severe enough, then the TCB 61 will not take itself off-line. However, once it is decided that the hardware is faulty, it is unknown at that point whether it is because of a communication fault or because the TBC 61 is faulty. Both cases are treated similarly in the sense that the auto-reconnect logic of the present invention is activated. Recognizer logic within the processor A 63 takes advantage of a subset of the self test procedures that are already part of the TBC 61 which are executed whenever the node goes through power up, thereby determining if there is a hardware or communication error. If the suit of tests passes, there is nothing wrong with the TBC 61 and the TBC 61 erroneously reported that there was bad hardware (up to a maximum number of times). If self test fails (e.g., 3 times in the preferred embodiment) each time, then there is a hardware problem. Thus the error recognition process is based on the decision making as determined by self test, and in conjunction with the steps discussed hereinunder relative to FIG. 4, comprise the method of the preferred embodiment of the present invention.

Figure 4:
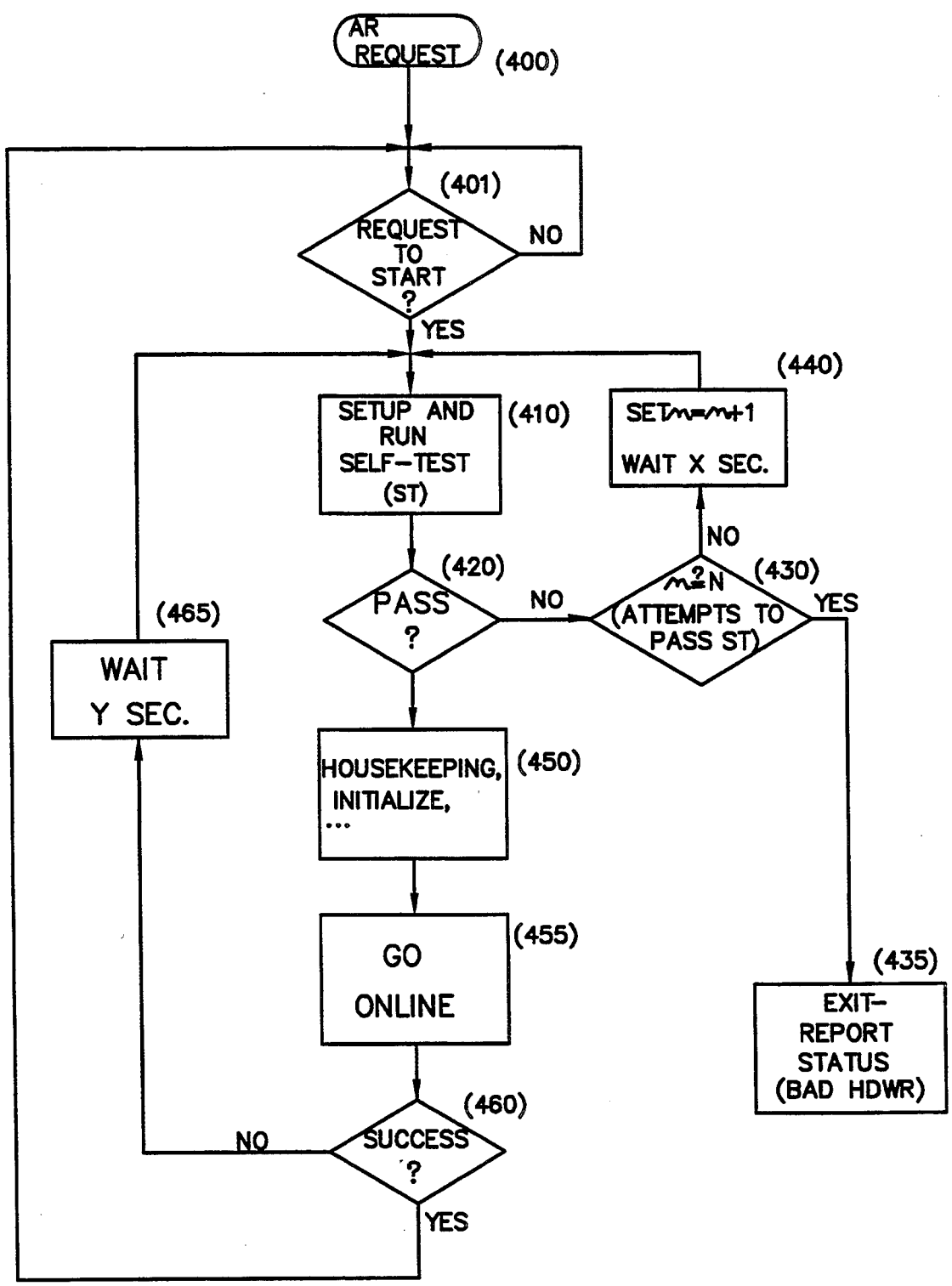
FIG. 4 shows a flow diagram of the preferred embodiment of the method of the present invention.

Referring to FIG. 4, there is shown a flow diagram of the preferred embodiment of the present invention. Once the TBC 61 detects a deteriorated network, a jabber condition or faulty transmitter, the TBC 61 takes itself off-line and reports the condition to the processor A63 of the communication unit 60. The processor A includes logic (logical link control—LLC) which performs to the IEEE 802.2 standard well known to those skilled in the art.

The communication to processor A63 is denoted AR REQUEST in FIG. 4 and starts the auto-reconnect process (block 400). The logic of FIG. 4 is in the form of a dormant task of processor A63 (block 401). When the request is made the logic continues to block 410. The processor A63 performs initialization tasks, and attends to outstanding transmit and receive buffer queues entries. (In the preferred embodiment, the housekeeping/initialization includes flushing transmit queues and image shared RAM, if present.) A self test (ST) of the TBC 61 (block 410) is then initiated. If the self test does not pass (block 420), and a predetermined number of attempts has been made at self test and failed (block 430) the task exits and reports bad hardware to the processor A63 (block 435), more specifically, the result is reported to the redundancy task. If the predetermined number of attempts at passing self test has not been reached (block 430), the count is increased and after a predetermined time (block 440), self test is re-executed (block 410). If self test passes (block 420), the TBC is initialized and any housekeeping tasks are done (block 450), which in the preffered embodiment includes re-opening previously opened SAPs (service access point) and reconstructing receive free buffer linked list. Then the TBC 61 attempts to enter the ring, i.e., go online (block 455). The processor A63 commands the TBC 61 to attempt reconnect via control signals from processor A63, in a manner well known to those skilled in the art. If the attempt to go online is not successful (block 460), after a predetermined time (block 465), self test is re-run (block 410). If the attempt to go online is successful (block 460), the task goes back to its dormant state (block 401), and the node is back online, resuming its normal communications over the UCN 14 thereby accomplishing the automatic reconnect. The predetermined wait times of the preferred embodiment of the present invention is 30 seconds.

While there has been shown what is considered the preferred embodiment of the present invention, it will be manifest that many changes and modifications can be made therein without departing from the essential scope and spirit of the invention. It is intended, therefore, in the annex claims to cover all such changes and modifications that fall within the true scope of the invention.

I claim:

1. In a local area network system having redundant communication media, a plurality of nodes, each node connected to the redundant communication media, wherein each node is capable of communicating with each other node in accordance with a predetermined protocol via the redundant communication media, and further wherein each node is capable of disconnecting from the redundant communication media when an error in communications is detected, a method of automatically reconnecting the node to the redundant communication media after the node disconnects from the redundant communication media comprising the steps of:

a) detecting a faulty communication condition;
   b) disconnecting the node from the redundant communication media;
   c) attending to any outstanding transmit/receive tasks;
   d) performing internal testing of the node;
   e) if the internal testing passes,
      i) attempting to reconnect the node to the redundant communication media; and
      ii) proceeding to step (f); otherwise
      iii) proceeding to step (d);
   f) if the attempted reconnect is unsuccessful,
      i) waiting a first predetermined period of time; and then
      ii) proceeding to step (d);
   g) if the attempted reconnect is successful, resuming normal communications by the node over the redundant communication media.

2. A method of automatically reconnecting according to claim 1, wherein the step of proceeding to step (d) of claim 1, e, iii further comprises the steps of:

a) incrementing a count;
   b) waiting a second predetermined period of time;
   c) checking the count; and
   d) if the count is greater than a predetermined value, and the faulty result of each of the previous internal testing has been identical,
      i) exiting the method with a status indication of faulty hardware, otherwise;
      ii) proceeding to the step of performing the internal testing of the node.

3. A method of automatically reconnecting according to claim 2, wherein the node includes interface logic (61) for providing services which simplify interfacing a processor (63) of the node (30, 40) to the redundant communication media (14), wherein the step of performing internal testing of the node includes the step of:

a) performing self test of the interface logic (61).

4. A method of automatically reconnecting according to claim 1, wherein the node includes interface logic (61) for providing services which simplify interfacing a processor (63) of the node (30, 40) to the redundant communication media (14), wherein the step of performing internal testing of the node includes the step of:

a) performing self test of the interface logic (61).

5. A method of automatically reconnecting according to claim 4, wherein the node includes interface logic (61) for providing services which simplify interfacing a processor (63) of the node (30,40) to the redundant communication media (14), the interface logic (61) including silence detection logic, wherein the step of performing internal testing of the node further includes the steps of:

a) performing tests on the silence detection logic; and
   b) performing tests of the state of the redundant communication media (14).

* * * * *